United States Patent [19]

Petisce

[11] Patent Number: 5,147,433
[45] Date of Patent: Sep. 15, 1992

[54] METHODS OF MAKING COATED OPTICAL FIBER

[75] Inventor: James R. Petisce, Norcross, Ga.

[73] Assignee: AT&T Bell Laboratories, Murray Hill, N.J.

[21] Appl. No.: 780,451

[22] Filed: Oct. 22, 1991

Related U.S. Application Data

[60] Continuation of Ser. No. 659,985, Feb. 22, 1991, abandoned, which is a division of Ser. No. 480,414, Feb. 15, 1990, Pat. No. 5,015,068.

[51] Int. Cl.$^5$ ................. C03C 25/02; C03B 37/025
[52] U.S. Cl. .................................... 65/3.11; 65/3.43; 427/163; 264/1.5
[58] Field of Search ............ 65/3.11, 3.43; 427/163; 264/1.5

[56] References Cited

U.S. PATENT DOCUMENTS

| | | | |
|---|---|---|---|
| 4,388,093 | 6/1983 | Kimura et al. | 65/3.11 |
| 4,472,019 | 9/1984 | Bishop et al. | 350/96.3 |
| 4,472,021 | 9/1984 | Ansel et al. | 350/96.23 |
| 4,474,830 | 10/1984 | Taylor | 427/54.1 |
| 4,482,204 | 11/1984 | Byler et al. | 350/96.34 |
| 4,514,037 | 4/1985 | Bishop et al. | 350/96.23 |
| 4,522,465 | 6/1985 | Bishop et al. | 350/96.30 |
| 4,848,869 | 7/1989 | Urruti | 65/3.43 X |
| 4,851,165 | 7/1989 | Rennell et al. | 264/1.5 |
| 4,886,339 | 12/1989 | Scozzafava | 350/96.34 |
| 5,000,772 | 3/1991 | Petisce | 65/3.11 |
| 5,021,072 | 6/1991 | Atkins et al. | 65/3.11 |

FOREIGN PATENT DOCUMENTS

| | | |
|---|---|---|
| 60-02255 | 1/1985 | Japan . |
| 60-249111 | 12/1985 | Japan . |
| 62-044259 | 2/1987 | Japan . |
| 64-18948 | 1/1989 | Japan . |

*Primary Examiner*—Robert L. Lindsay
*Attorney, Agent, or Firm*—Edward W. Somers

[57] ABSTRACT

A drawn optical fiber (21) is provided with inner and outer layers (42,44) of coating material to protect the optical fiber during handling and use. The coating materials are such that they are characterized by being curable upon exposure to different portions of the light spectrum. In a preferred embodiment, the coating material of the inner layer includes a photoinitiator which absorbs light in the visible portion of the light spectrum whereas the outer coating material of the outer layer includes a photoinitiator which absorbs light in the ultraviolet light portion of the light spectrum.

4 Claims, 3 Drawing Sheets

U.S. Patent
Sep. 15, 1992
Sheet 1 of 3
5,147,433
FIG. 1
FIG. 2
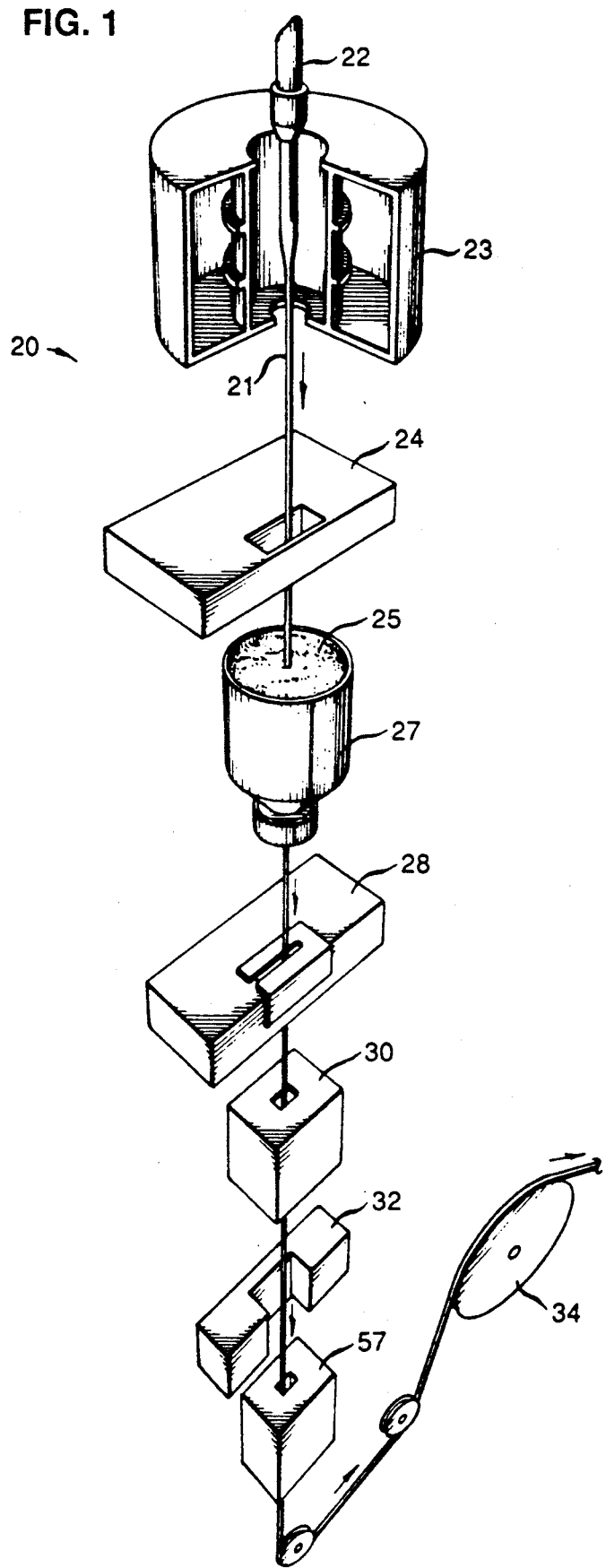
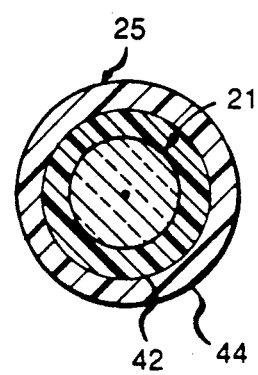

METHODS OF MAKING COATED OPTICAL FIBER

This application is a continuation of application Ser. No. 07/659,985 abandoned, filed on Feb. 22, 1991 which is a division of application Ser. No. 07/480,414 filed on Feb. 15, 1990, now U.S. Pat. No. 5,015,068.

TECHNICAL FIELD

This invention relates to methods of making coated optical fiber. More particularly, the invention relates to methods of making an optical fiber having inner and outer layers of curable coating materials, one of which may be curable by exposure to the visible light spectrum.

BACKGROUND OF THE INVENTION

In the manufacture of optical fiber, a glass preform rod which generally is manufactured in a separate process is suspended vertically and moved into a furnace at a controlled rate. The preform softens in the furnace and optical fiber is drawn freely from the molten end of the preform rod by a capstan located at the base of a draw tower.

Because the surface of the optical fiber is very susceptible to damage caused by abrasion, it becomes necessary to coat the optical fiber, after it is drawn, before it comes into contact with any surface. Inasmuch as the application of a coating material must not damage the glass surface, the coating material is applied in a liquid state. Once applied, the coating material must become solidified rapidly before the optical fiber reaches the capstan. This may be accomplished by photocuring, for example.

Those optical fiber performance properties which are affected most by the coating material are strength and transmission loss. Coating defects which may expose the optical fiber to subsequent damage arise primarily from improper application of the coating material. Defects such as large bubbles or voids, non-concentric coatings with unacceptably thin regions, or intermittent coatings must be prevented. The problem of bubbles in the coating material has been overcome. See, for example, U.S. Pat. No. 4,851,165 which issued on Jul. 25, 1989 in the names of J. A. Rennell, Jr. and C. R. Taylor. Intermittent coating is overcome by insuring that the fiber is suitably cool at its point of entry into the coating applicator to avoid coating flow instabilities. Coating concentricity can be monitored and adjustments made to maintain an acceptable value.

Optical fibers are susceptible to a transmission loss mechanism known as microbending. Because the fibers are thin and flexible, they are readily bent when subjected to mechanical stresses, such as those encountered during placement in a cable or when the cabled fiber is exposed to varying temperature environments or mechanical handling. If the stresses placed on the fiber result in a random bending distortion of the fiber axis with periodic components in the millimeter range, light rays, or modes, propagating in the fiber may escape from the core. These losses, termed microbending losses, may be very large, often many times the intrinsic loss of the fiber itself. The optical fiber must be isolated from stresses which cause microbending. The properties of the optical fiber coating material play a major role in providing this isolation, with coating geometry, modulus and thermal expansion coefficient being the most important factors.

Typically two layers of coating materials are applied to the drawn optical fiber. Furthermore, two different kinds of coating materials are used commonly. An inner layer which is referred to as a primary coating material is applied to be contiguous to the optical glass fiber. An outer layer which is referred to as a secondary coating material is applied to cover the primary coating material. Usually, the secondary coating material has a relatively high modulus, e.g. $10^9$ Pa, whereas the primary coating material as a relatively low modulus such as, for example, $10^6$ Pa. In one arrangement, the primary and the secondary coating materials are applied simultaneously. Such an arrangement is disclosed in U.S. Pat. No. 4,474,830 which issued on Oct. 2, 1984 in the name of C. R. Taylor.

Subsequently, both the inner and the outer layers of coating materials are cured beginning from the outside progressing inwardly. Also typically, the primary and the secondary coating materials comprise ultraviolet light curable materials each being characterized by a photoactive region. A photoactive region is that region of the light spectrum which upon the absorption of curing light causes the coating material to change from a liquid material to a solid material. Both the materials which have been used for the primary and for the secondary materials have comparable photoactive regions. Because the photoactive regions are comparable, the curing light for the primary coating material will be attenuated by the secondary coating material. As a result of the attenuation, less light reaches the primary coating material.

Of course, notwithstanding the attenuation of the curing light by the secondary coating material, it is important that the primary coating material be fully cured. This problem has been overcome in the prior art by reducing the line speed to allow longer exposure time of the primary coating material to the ultraviolet curing light energy inasmuch as the ultraviolet curing light energy is inversely proportional to line speed.

Although the foregoing solution is a workable one, it has its shortcomings. Most importantly, any reduction in line speed is not desirable and runs counter to current efforts to increase draw lengths and to increase substantially draw speeds of the optical fiber.

What is needed and seemingly what is not disclosed in the prior art is a coated optical fiber which overcomes the foregoing problem of attenuation by the secondary coating material of the light energy used to cure the primary coating material. Any solution should be one which does not affect adversely the line speed. Further, methods which must be implemented to make such a sought after coated optical fiber must be capable of being integrated with present manufacturing arrangements for drawing optical fiber from a preform.

SUMMARY OF THE INVENTION

The foregoing problems of the prior art have been solved by the methods of making coated optical fiber. A coated optical fiber of this invention includes optical glass fiber and an inner coating material which engages and which encloses the optical glass fiber. The inner coating material is enclosed by an outer coating material which engages the inner coating material. The inner and the outer coating materials are such that they are characterized by being curable at different regions of the light spectrum. For example, the inner coating material may be one which is characterized as being curable upon exposure to the visible light spectrum and the outer coating material may be one which is characterized as being curable upon exposure to the ultraviolet light spectrum.

In a method of this invention, optical fiber is drawn from a preform. Then a primary and a secondary coating material are applied simultaneously to the drawn fiber, the primary and the secondary coating materials being such that they are cured by exposure to difference portions of the light spectrum. In a preferred embodiment, the primary coating material which is contiguous to the optical fiber is one the photoactive region of which is in the visible light spectrum. On the other hand, the secondary coating material is one of which the photoactive region is in the ultraviolet light spectrum. In the preferred embodiment, the coating materials are cured first by exposing the drawn coated optical fiber to a curing lamp which is characterized by an emission spectrum exclusively in the visible light region. Subsequently, the secondary coating material is cured by exposing the drawn coated optical fiber to a curing lamp characterized by an emission spectrum exclusively in the ultraviolet light spectrum. Then the drawn, coated optical fiber is taken up.

BRIEF DESCRIPTION OF THE DRAWING

Other features of the present invention will be more readily understood from the following detailed description of specific embodiments thereof when read in conjunction with the accompanying drawings, in which:

FIG. 1 is a schematic view of a manufacturing line for drawing optical fiber from a preform;

FIG. 2 is an end view in section of a drawn coated optical fiber;

DETAILED DESCRIPTION

Figure 3:
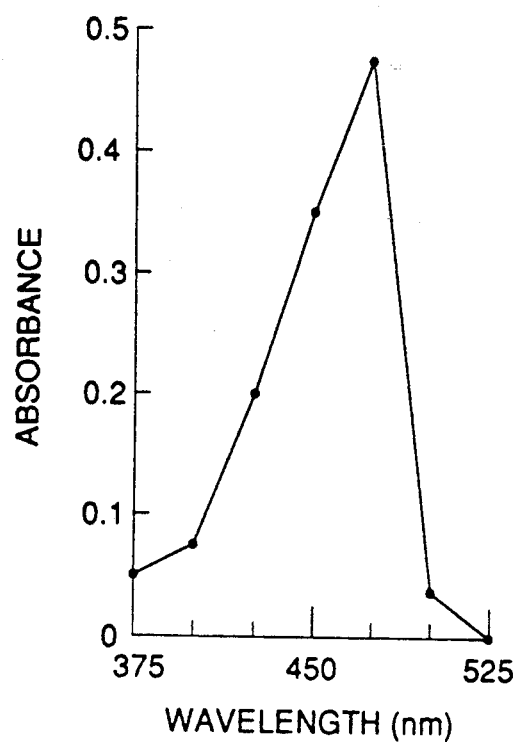
FIG. 3 is a graph which depicts a plot of absorbance versus wavelength in and in the vicinity of the visible light region.

Referring now to FIG. 1, there is shown an apparatus which is designated generally by the numeral 20 and in which is used to draw optical fiber 21 from a specially prepared cylindrical preform 22 and for then coating the drawn fiber. The optical fiber 21 is formed by locally and symmetrically heating the preform 22, typically 7 to 25 mm in diameter and 60 cm in length, to a temperature of about 2000° C. As the preform is fed into and through a furnace 23, fiber 21 is drawn from the molten material.

As can be seen in FIG. 1, the elements of the draw system include the furnace 23 wherein the preform is drawn down to the fiber size after which the fiber 21 is pulled from a heat zone therein. The diameter of the fiber 21 is measured by a device 24 at a point shortly after the fiber is formed and this measured value becomes an input into a control system. Within the control system, the measured diameter is compared to the desired value and an output signal is generated to adjust the draw speed such that the fiber diameter approaches the desired value.

After the diameter of the optical fiber 21 is measured, a protective coating system 25 (see also FIG. 2) is applied to the fiber by an apparatus 27. Preservation of fiber strength requires the application of the protective coating, which shields newly drawn fiber from the deleterious effects of the atmosphere. This coating system must be applied in a manner that does not damage the surface of the fiber 21 and such that the fiber has a predetermined diameter and is protected from abrasion during subsequent manufacturing operations, installation and service. Minimizing attenuation requires the selection of a suitable coating material and a controlled application of it to the fiber. Such a coating apparatus may be one such as that described in priorly identified U.S. Pat. No. 4,474,830. Minimizing diameter variation which in turn minimizes the losses due to misalignment at connector and splice points requires careful design of the draw system and the continuous monitoring and control of the fiber diameter during the drawing and the coating steps of the process. Then, the coated fiber 21 is passed through a centering gauge 28.

After the coating materials have been applied to the drawn fiber, the coating materials must be cured. Accordingly, the optical fiber having the coating materials thereon is passed through a device 30 for curing the coating system and a device 32 for measuring the outer diameter of the coated fiber. Afterwards, it is moved through a capstan 34 and is spooled for testing and storage prior to subsequent cable operations.

In the apparatus 27, the coating system 25 comprising two coating materials are applied to the optical fiber. The coating system 25 includes an inner layer 42 (see FIG. 2) which often is referred to as a primary coating layer and an outer layer 44 which often is referred to as a secondary coating material. The coating material of the inner layer which has a substantially lower modulus than that of the outer layer, is such that it prevents microbending of the optical glass fiber. On the other hand, the higher modulus outer layer provides mechanical protection for the drawn glass fiber.

Each of the coating materials is curable by being exposed to a portion of the light spectrum. Generally each of the coating materials includes an oligomer, a diluent and a photoinitiator. Also included may be additives such as, for example, antioxidants, adhesion promoters, ultraviolet (UV) light stabilizers, surfactants and shelf life stabilizers.

Importantly, the coating material of the inner layer 42 is such that it cures upon exposure to a different portion of the light spectrum than does the outer layer 44. As a result, the light energy which passes through the outer layer 44 and impinges on the inner layer 42 to cure the coating material thereof is not attenuated by absorption in the outer layer.

In a preferred embodiment, one of the layers of the coating system 25 is curable upon exposure to the visible light spectrum and the other upon exposure to the ultraviolet light spectrum. More particularly, in the preferred embodiment, the coating material of the inner layer 42 is curable upon exposure to the visible light spectrum whereas the coating material of the outer layer 44 is curable upon exposure to the ultraviolet light spectrum. To this end, the composition of the coating material of the inner layer 42 includes a photoinitiator which may comprise camphorquinone. For the outer layer, the photoinitiator may be a 2,2 dimethoxy, 2 phenylacetophenone such as Irgacure 651 which is marketed by the Ciba Giegy Company. The photoinitiator of the outer layer which is ultraviolet light curable also may be a 1 phenyl, 2 hydroxy, 2 methylpropanone such as Darocure 1173 which is marketed by the EM Industries Company.

Figure 4:
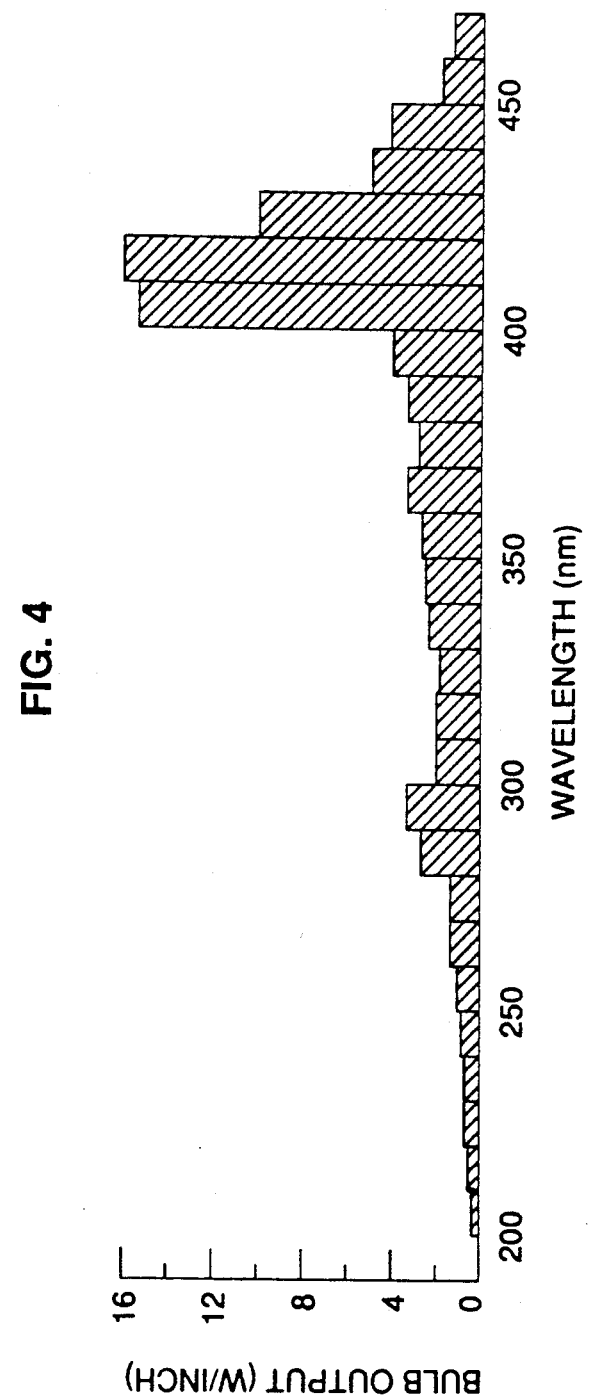
FIG. 4 is a histogram which shows the emission output of a commercially available light curing bulb which has substantially most of its output in the visible light region.

Going now to FIG. 3, there is shown a graph which depicts absorbance of a coating composition of matter versus wavelength. The wavelengths depicted are those generally in what is considered to be the visible light spectrum. FIG. 3 shows that the coating composition of matter of the inner layer 42 absorbs in the visible light spectrum. If the coating material absorbs in a specified wavelength region, an inquiry must be made as to how to radiate it in the region where absorbed. In FIG. 4 there is shown a histogram of output in watts per inch for a commercially available bulb versus wavelength in nanometers.

Figure 5:
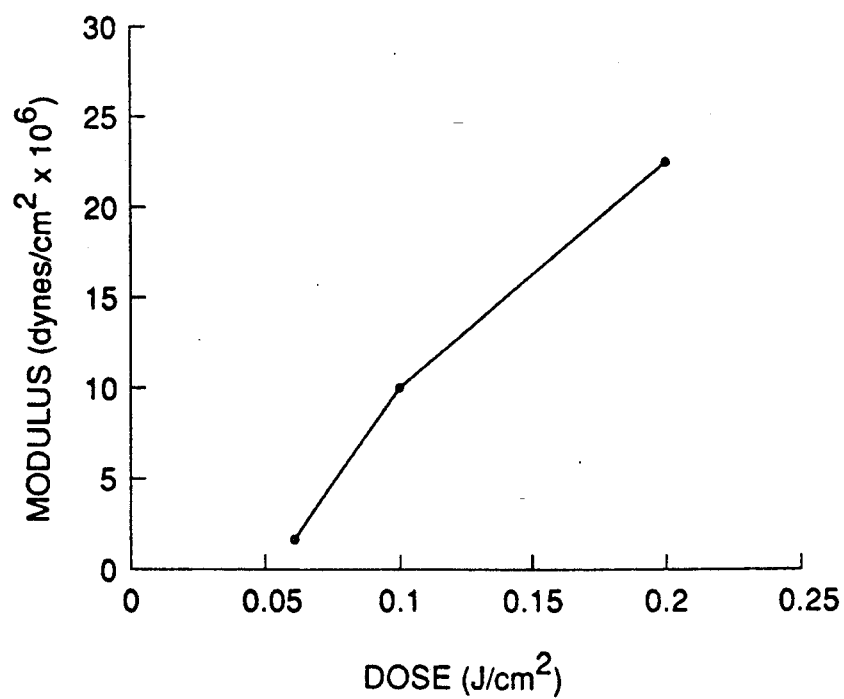
FIG. 5 is a graph depicting modulus versus dose for a coating material which is cured upon exposure to the visible light spectrum.

When using a bulb having the output spectrum shown in FIG. 4 to irradiate the coating formulation having an absorbance plot as shown in FIG. 3, then the modulus follows the curve shown in FIG. 5. As shown in FIG. 5, when the proper lamp is used to irradiate the composition of matter that absorbs at the wavelengths of FIG. 4, then the inner layer will cure to have moduli corresponding to the doses disclosed in FIG. 5.

Advantageously, the methods of this invention allow the use of higher cure speeds than used priorly. Because the curing energy that is used to cure the inner layer 42 is not attenuated by the outer layer 44, not as much time is needed for exposure to overcome such attenuation.

It is to be understood that the above-described arrangements are simply illustrative of the invention. Other arrangements may be devised by those skilled in the art which will embody the principles of the invention and fall within the spirit and scope thereof.

I claim:

1. A method of coating optical fiber, said method comprising the steps of:
   drawing optical fiber from a preform;
   applying inner and outer layers of coating materials to the drawn fiber, the coating materials being such that the photoactive region of one is different from the photoactive region of the other;
   curing the coating material of the inner layer by first exposing the drawn coated fiber to a curing lamp which is characterized by an emission spectrum exclusively in one light region; and
   subsequently curing the coating material of the outer layer by exposing the drawn optical fiber to a curing lamp characterized by an emission spectrum exclusively in another light region; and
   taking up the drawn coated fiber.

2. The method of claim 1, wherein one of the coating materials cures by exposure to the visible light spectrum and the other one of the coating materials cures upon exposure to the ultraviolet light spectrum.

3. A method of coating optical fiber, said method comprising the steps of:
   drawing optical fiber from a preform;
   applying inner and outer layers of coating materials simultaneously to the drawn fiber, the coating material of the inner layer being one the photoactive region of which is in the visible light spectrum and the coating material of the outer layer being one of which the photoactive region is in the ultraviolet light spectrum;
   curing the coating materials by first exposing the drawn coated fiber to a curing lamp which is characterized by an emission spectrum exclusively in visible light region; and
   subsequently curing the coating material of the outer layer by exposing the drawn optical fiber to a curing lamp characterized by an emission spectrum exclusively in the ultraviolet light spectrum; and
   taking up the drawn coated fiber.

4. The method of claim 3, wherein the inner coating material includes a photoinitiator which comprises camphorquinone which absorbs light in the visible light region of the spectrum.

* * * * *